UNITED STATES PATENT OFFICE.

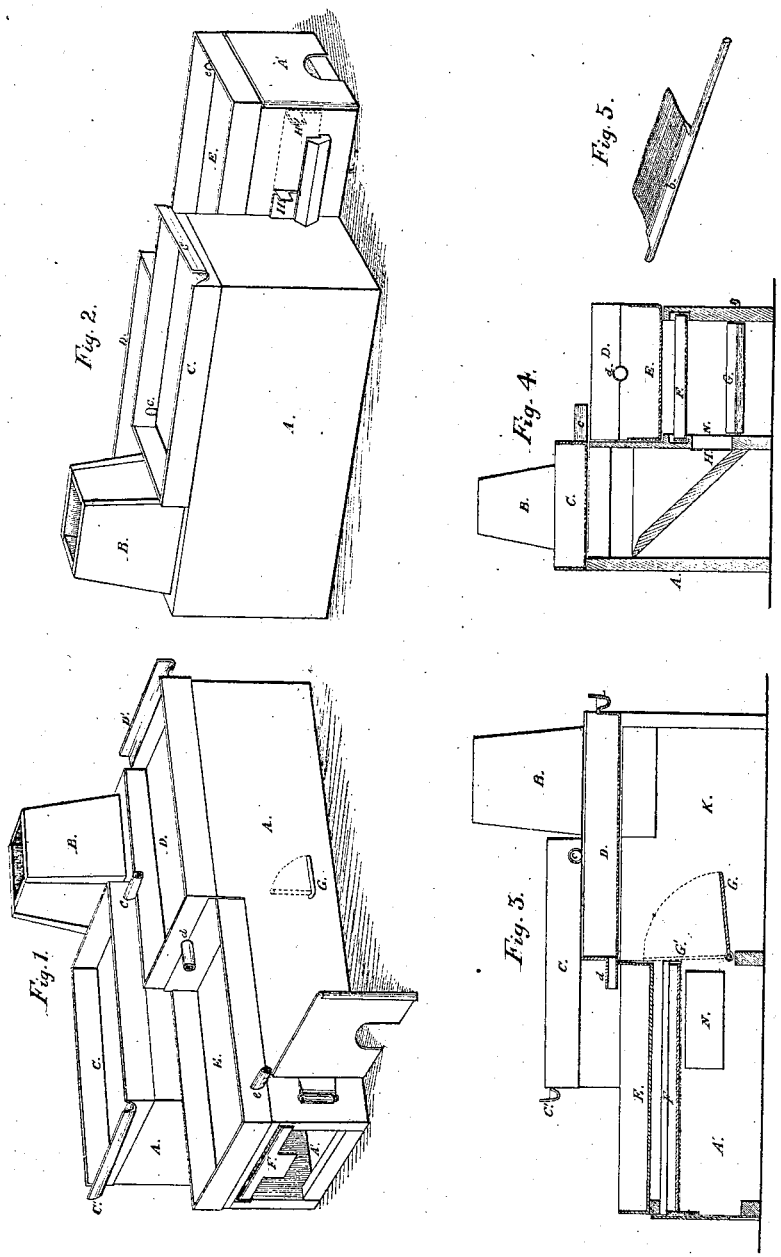
T. C. Bartle.
Evaporating Pan.
N° 40,232. Patented Oct. 13, 1863.

T. C. BARTLE, OF INDEPENDENCE, IOWA.

IMPROVEMENT IN SUGAR-EVAPORATORS.

Specification forming part of Letters Patent No. 40,232, dated October 13, 1863.

*To all whom it may concern:*

Be it known that I, T. C. BARTLE, of Independence, in the county of Buchanan and State of Iowa, have invented certain new and useful Improvements in Sugar-Evaporators; and I do hereby declare that the following is a full and complete description of the construction and operation of the same, reference being had to the accompanying drawings, making a part of this specification, in which—

Figures 1 and 2 are perspective views. Fig. 3 is a longitudinal section. Fig. 4 is a transverse section. Fig. 5 represents the skimmer.

Like letters of reference indicate like parts.

The nature of my improvement relates to the form of the pans and the manner of arranging them on the furnace, and to the skimmer for removing the scum from the sirup, and also to an arrangement for generating steam under one of the pans, in which the sirup can be concentrated without danger of scorching or burning.

A represents the furnace—made of stone, brick, or metal—that extends under all the pans, the interior being divided into flues, through which the passage of the heat is regulated by dampers. The fire is made in the front part, A', and the smoke passes through the flues into the chimney B.

The pans C, D, and E are arranged on different elevations of the furnace—one above the other, as represented in Fig. 1. On the outside ends of the pans C and D are channels C' and D', to carry off the scum removed from the sirup.

*c*, *d*, and *e* are spouts through which the sirup is drawn from the respective pans.

Directly under the pan E is a pan, F, (shown in Figs. 3 and 4,) that is designed to contain water for the purpose of generating steam. This pan should be made entirely of metal, but the sides and ends of the other three can be made of wood.

G, Figs. 1 and 3, is a damper for the purpose of regulating the heat in the flue K under the pan D; and H, Figs. 2 and 4, is a damper that regulates the heat in a similar manner under the pan C. These dampers are so arranged that all the heat can be conveyed from the fire-box A' through the opening N to that division of the furnace upon which the pan C rests; or by closing the damper H and opening the damper G the whole of the heat may be carried into the division under the pan D, and by opening the dampers G and H, respectively, to different degrees, the heat can be regulated at pleasure, in regard to its intensity, under both the pans C and D.

The skimmer or strainer (represented by Fig. 5) is made of wood or metal, the part *b* being of such a length as to fit between the sides of the pan, to which is attached a woolen or other kind of cloth, as shown in the figure.

The practical operation of this evaporator is as follows: All the pans are placed on the furnace, as shown in Figs. 1 and 2, the pan F being filled about half-full of water. The damper G should be closed, as indicated at G' in Fig. 3, and the damper H opened, as indicated at H', Fig. 2, so that the heat will pass up under the pan C, filled with the juice, the pans D and E being empty. Make the fire in the furnace and heat the juice in the pan C till it is at the boiling-point; then use the skimmer, drawing it over the top of the edges of the pan. Being constructed as described, it removes the scum, and the floating particles mingled in the juice below the surface are swept out by means of the cloth into the channel C', designed for that purpose, as described. This pan being skimmed, draw the contents of it into the pan D through the spout *c*, filling again the pan C with cold juice. Turn down the damper G to let a portion of the heat under the pan D, which can be regulated as desired. If this pan should come to the boiling-point before the juice in the pan C, close the damper G until they are both ready to skim, then skim them in the way before described. After skimming draw the juice or sirup from the pan D into the pan E through the spout *d*, and discharge the pan C into the pan D, filling it again with cold juice, as before. The scum which was removed from the pan D can be put into the pan C to prevent unnecessary waste of the saccharine matter. Draw out the pan F from the furnace, letting the heat directly to the pan E, the contents of which should be evaporated rapidly. When it becomes so thick that there is danger of burning or scorching, replace the pan F, keeping it properly supplied with water, close the furnace-door, and as the water boils the steam will evaporate the sirup in the pan E to any desired consistency without scorching. While the sirup in this pan is evaporating the other pans must be skimmed and the heat regulated under them until the sirup in the pan E is sufficiently concentrated to be emptied, so as to receive the contents of the pan D, and the pan D that of the pan C. When the sirup in the pan E is ready to be drawn off, open the door of the furnace, and a current of air will pass between the pans E and F, which will check the boiling of the sirup. It can then be drawn through the spout $e$ into a cooler and prepared for crystallization, if desired.

What I claim as my improvement, and desire to secure by Letters Patent, is—

1. Constructing the pans as herein described, and arranging them at different elevations in the order named, for the purpose specified.

2. The dampers H and G, when arranged and operating as and for the purpose set forth.

3. The herein-described arrangement of flues within the body of the furnace and beneath the several pans, for the purpose specified.

4. The adjustable steam-generator F, when arranged and operated as and for the purpose described.

5. The skimmer, constructed as herein specified.

T. C. BARTLE.

Witnesses:
W. McDONALD,
LYMAN R. LEGG.